US012410338B2

(12) United States Patent
Stanssens et al.

(10) Patent No.: US 12,410,338 B2
(45) Date of Patent: Sep. 9, 2025

(54) POLYMERIC COATING FORMULATION WITH HYDROPHOBIC SIDE CHAINS

(71) Applicant: Solenis Belgium, Brussels (BE)

(72) Inventors: Dirk Stanssens, Houthalen (BE); Frank Driessen, Vliermaalroot (BE); Mohammadtaghi Savoji, Glen Allen, VA (US)

(73) Assignee: Solenis Technologies, L.P., Wilmington, DE (US)

( * ) Notice: Subject to any disclaimer, the term of this patent is extended or adjusted under 35 U.S.C. 154(b) by 755 days.

(21) Appl. No.: 17/310,864

(22) PCT Filed: Feb. 24, 2020

(86) PCT No.: PCT/EP2020/054772
§ 371 (c)(1),
(2) Date: Aug. 27, 2021

(87) PCT Pub. No.: WO2020/173876
PCT Pub. Date: Sep. 3, 2020

(65) Prior Publication Data
US 2022/0135829 A1    May 5, 2022

(30) Foreign Application Priority Data

Feb. 28, 2019 (EP) .................................... 19159936

(51) Int. Cl.
| | | |
|---|---|---|
| *C09D 133/08* | (2006.01) | |
| *C08F 220/18* | (2006.01) | |
| *C08K 3/34* | (2006.01) | |
| *D21H 19/60* | (2006.01) | |

(52) U.S. Cl.
CPC ...... *C09D 133/08* (2013.01); *C08F 220/1804* (2020.02); *C08K 3/34* (2013.01); *D21H 19/60* (2013.01); *C08F 220/1808* (2020.02)

(58) Field of Classification Search
CPC ............. C09D 133/08; C08F 220/1804; C08F 220/1808; C08K 3/34; D21H 19/60; Y02P 20/582
See application file for complete search history.

(56) References Cited

U.S. PATENT DOCUMENTS

| | | | | |
|---|---|---|---|---|
| 6,897,255 | B1 * | 5/2005 | Thames ............... | C09D 133/06 524/400 |
| 10,227,511 | B2 | 3/2019 | Bauer et al. | |
| 2012/0329898 | A1 | 12/2012 | Weikel et al. | |
| 2014/0296384 | A1 * | 10/2014 | Hazra ...................... | C09D 5/08 523/437 |
| 2017/0009111 | A1 * | 1/2017 | Bauer ..................... | C09J 133/08 |

FOREIGN PATENT DOCUMENTS

| | | | | |
|---|---|---|---|---|
| CN | 1254041 | A | 5/2000 | |
| CN | 101426749 | A | 5/2009 | |
| CN | 106164113 | A | 11/2016 | |
| EP | 0314326 | A1 | 5/1989 | |
| EP | 1010807 | A1 | 6/2000 | |
| EP | 2010467 | B1 | 3/2010 | |
| EP | 2712898 | A1 * | 4/2014 | ............ A61B 17/14 |
| EP | 2990445 | A1 | 3/2016 | |
| JP | H05209348 | A | 8/1993 | |
| JP | H07316492 | A | 12/1995 | |
| JP | 2000154493 | A | 6/2000 | |
| JP | 2001279598 | A | 10/2001 | |
| WO | 2005026283 | A1 | 3/2005 | |
| WO | 2007124399 | A2 | 11/2007 | |
| WO | 2008014903 | A1 | 2/2008 | |
| WO | 2011017388 | A2 | 2/2011 | |
| WO | 2014092914 | A1 | 6/2014 | |
| WO | WO-2014172185 | A1 * | 10/2014 | ............... B05D 1/42 |
| WO | 2014190515 | A1 | 12/2014 | |
| WO | 2015119873 | A1 | 8/2015 | |
| WO | WO-2016094277 | A1 * | 6/2016 | ............ B32B 27/08 |
| WO | WO-2017050589 | A1 * | 3/2017 | ............... B05D 1/40 |
| WO | 2018156685 | A1 | 8/2018 | |
| WO | WO-2019043111 | A1 * | 3/2019 | ............... B65D 3/12 |

OTHER PUBLICATIONS

Harper, "Modern Plastics Handbook", China Petrochemical Press, 2003.
ISA/EP, International Search Report issued in International Application No. PCT/EP2020/054772 dated Feb. 24, 2020.

* cited by examiner

*Primary Examiner* — Katarzyna I Kolb
(74) *Attorney, Agent, or Firm* — Lorenz & Kopf, LLP

(57) ABSTRACT

A coating formulation including a polymer produced by radical polymerization, wherein said polymer comprises a backbone with one or more monomers, wherein one or more of said monomers comprises one or more hydrophobic side chains, wherein the hydrophobic side chains are alkyl chains with 8 or more carbon atoms, wherein the overall weight of the hydrophobic side chains is at least 20% (w/w %) of the total weight of the polymer; and one or more anti-blocking agents selected from inorganic pigments, polymers with a Tg or Tm of at more than 40° C., or a combination thereof; wherein said coating formulation comprises at least 30% (w/w %) of said polymer, wherein in weight percent of the coating formulation, the amount of the inorganic pigment is from about 10% to 30% and the amount of polymer with a Tg or Tm of more than 40° C. is from about 10% to about 40%.

18 Claims, No Drawings

POLYMERIC COATING FORMULATION WITH HYDROPHOBIC SIDE CHAINS

CROSS-REFERENCE TO RELATED APPLICATIONS

This is a National Stage of International Application No. PCT/EP2020/054772, filed Feb. 24, 2020, which claims the benefit of European Patent Application No. 19159936.4, filed Feb. 28, 2019.

TECHNICAL FIELD

The present disclosure is in the field of coating formulations, in particular for coating formulations to make substrates such as paper, plastic or cardboard, heat sealable, water repellent and oil repellent. The present disclosure therefore relates to a coating formulation comprising a polymer produced by radical polymerisation and wherein said polymer comprises a backbone with one or more monomers that comprise hydrophobic side chains. The disclosure further relates to a heat sealable, water repellent and oil repellent substrate with said coating formulation and to a process for making such a substrate.

BACKGROUND

Currently, there is a trend in switching from plastic based packaging material to paper or cardboard material because of environmental reasons. Paper and cardboard are natural materials derived from trees and hence these materials are abundantly present and are bio-renewable. Further, the materials can, after their use, be recycled to new paper or cardboard materials.

On the other hand, the use of paper or cardboard in the manufacture of beverage or food cups or boxes has major drawbacks compared to plastic material. It has limited barrier properties and it has no heat sealability properties.

To overcome these disadvantages, the paper used for cups or food boxes, also called cupstock, are nowadays laminated with a plastic foil. In the packaging technology, heat sealing is a conventional method for manufacturing or closing containers or packages of a polymer film or polymer-coated packaging material, such as paper or cardboard. Low density polyethylene (LDPE) is a material commonly used in packages because of its easy heat sealability. Besides heat sealability, the plastic provides good barrier properties against water, oil and grease as well. Furthermore, many other polymers are used in packages, for example polyesters. These polymers have better water vapour and/or oxygen barrier properties than polyethylene, but their heat sealability is lower.

However, cupstock laminated with a plastic layer, such as LDPE or polylactic acid, is not accepted by most of the paper recycling facilities. The plastic layer is hard to remove from the cellulose fibers and it further results in clogging of the sieves of the recycling plant. As a result, the majority of the plastic laminated cupstock ends up in a landfill or the material has to be burnt as non-recyclable material in waste incinerators.

Therefore, the present disclosure provides a coating formulation with water and oil repellent characteristics, improved heat sealability as compared to the presently available coating formulations and the possibility to have an improved recyclability of the coated substrate. Hence, the coating formulation of the present disclosure is particularly useful for the coating of paper or cardboard to be used in the food packaging industry.

Repulpable coating formulations based on a polymer with water and oil repellent characteristics are for example known from JP 2000 154493, but this reference only provides examples wherein the coating is applied on a paper substrate as a barrier coating, including a forced air drying step, but fails to demonstrate how such formulation performs in the above mentioned heat sealing processes in the manufacture of cupstock. As further detailed below, it has been an objective of the present disclosure to provide a repulpable coating formulations based on a polymer, which besides water and oil repellent characteristics also has a good heat sealability.

BRIEF SUMMARY

Coating formulations, heat sealable, water repellent and oil repellent substrates comprising a substrate coated with a coating formulation, and processes for making a heat sealable, water repellent and oil repellent substrate are provided herein. In an embodiment, a coating formulation comprises:

a polymer produced by radical polymerization, wherein said polymer comprises a backbone with one or more monomers, wherein one or more of said monomers comprises one or more hydrophobic side chains, wherein the hydrophobic side chains are alkyl chains with 8 or more carbon atoms, wherein the overall weight of the hydrophobic side chains is at least 20% (w/w %) of the total weight of the polymer; and one or more anti-blocking agents selected from inorganic pigments, polymers with a Tg or Tm of at least 35° C., or a combination thereof; wherein said coating formulation comprises at least 30% (w/w %) of said polymer.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

The present disclosure discloses a coating formulation comprising a polymer produced by radical polymerization. Said coating formulation is particularly useful for making a substrate heat sealable and water and oil repellent. The polymer comprises an important fraction of hydrophobic side chains. In its combination with blocking agents (infra), the coating formulation of the present disclosure provides a heat sealable, water repellent and oil repellent coating event without the presence of a wax, which makes it particularly useful in the food industry.

In a first aspect, the present application relates to a coating formulation comprising a polymer produced by radical polymerization and wherein said polymer comprises a backbone with one or more monomers. These one or more monomers are exemplified in that at least 30% (w/w %) of said one or more monomers comprise one or more hydrophobic side chains. Typical for the disclosure is that those one or more hydrophobic side chains are alkyl chain with 8 or more carbon atoms. When expressed as amount in the total weight of the polymer, the coating formulation according to the disclosure comprises a polymer produced by radical polymerization, wherein the overall weight of those hydrophobic side chains is at least 20% (w/w %) of the total weight of the polymer. In a particular embodiment, the overall weight of the hydrophobic side chains is at least 25% (w/w %) of the total weight of the polymer. In yet another embodiment, the coating formulation of the disclosure is exemplified in that the overall weight of monomers including the hydrophobic side chains is at least 30% (w/w %) of the total weight of the polymer; in particular at least 40% (w/w %); more in particular from about 40% (w/w %) to about 70% (w/w %); of the one or more monomers in the backbone of the polymer comprise the one or more hydrophobic side chains.

The coating formulation of the present disclosure is further exemplified in that it comprises at least 30% (w/w %) of the polymer produced by radical polymerization. In other words, in the coating formulation of the present disclosure, at least 30% (w/w %) of the polymer produced by radical polymerization and comprising a backbone with one or more monomers having one or more hydrophobic side chains is present. In a more preferred embodiment, the coating formulation comprises between 30% (w/w %) and 80% (w/w %) of the polymer produced by radical polymerization. Said polymer comprises a backbone with one or more monomers comprising one or more hydrophobic side chains that are alkyl chains with 8 or more carbon atoms and the overall weight of the hydrophobic side chains is at least 30% (w/w %) of the total weight of the polymer.

The polymer present in the coating formulation of the present disclosure is typically exemplified in that it comprises a backbone with one or more monomers comprising one or more hydrophobic side chains that are alkyl chains with 8 or more carbon atoms. In a more preferred embodiment, said one or more hydrophobic side chains are alkyl chains with 8 to 18 carbon atoms. In some aspects, the hydrophobic side chains in one polymer are alkyl chains with a similar number of carbon atoms in each of the hydrophobic side chains. In said instance, the polymer comprises one or more hydrophobic side chains that are alkyl chains with either 8 to 18 carbon atoms. In some other aspects, the hydrophobic side chains in one polymer are alkyl chains with different numbers of carbon atoms. For example, in said instance, the alkyl chains in one polymer can be a combination of alkyl chains with 8, 9, 10, 11, 12, 13, 14, 15, 16, 17 and/or 18 carbon atoms.

As already indicated, the one or more monomers in the polymer comprise one or more hydrophobic side chains being alkyl chains with 8 or more carbon atoms. In some aspects, said alkyl chains can be linear alkyl chains. In other aspects, said alkyl chains can be branched alkyl chains. In some other aspects, the hydrophobic side chains in one polymer can be a combination of both linear and branched alkyl chains having 8 or more carbon atoms.

The polymer present in the coating formulation of the present disclosure is typically exemplified in that it comprises a backbone of one or more monomers. In a further embodiment, said one or more monomers are selected from acrylates, methacrylates, olefins, vinyl ethers, vinyl esters, styrenes, maleates, fumarates, itaconates or any derivatives thereof. The one or more monomers in the polymer can also be a combination of acrylates, methacrylates, olefins, vinyl ethers, vinyl esters, styrenes, maleates, fumarates, itaconates or any derivatives thereof.

In specific embodiment, the one or more monomers are acrylates. In a further embodiment, said acrylates are selected from methylacrylate, ethyl acrylate, (iso)propylacrylate, (iso)butylacrylate, tertiary butylacrylate, 2-ethylhexylacrylate, nonylacrylate, decylacrylate, laurylacrylate, palmitylacrylate, stearylacrylate, isobornylacrylate, or derivatives thereof.

In another specific embodiment, the one or more monomers are methacrylates. More specifically said methacrylates are selected from methylmethacrylate, ethyl methacrylate, (iso)propylmethacrylate, (iso)butylmethacrylate, tertiary butylmethacrylate, 2-ethylhexylmethacrylate, nonylmethacrylate, decylmethacrylate, laurylmethacrylate, palmitylmethacrylate, stearylmethacrylate, isobornylmethacrylate, or derivatives thereof.

In the radical polymerization reaction at least 30% (w/w %); in particular at least 40% (w/w %) of said monomers comprise a hydrophobic side chain, i.e. alkyl chains with 8 or more carbon atoms. In a specific embodiment the monomers comprising said hydrophobic side chain are acrylates, methacrylates or combinations thereof; in particular selected from 2-ethylhexylacrylate, nonylacrylate, decylacrylate, laurylacrylate, palmitylacrylate, stearylacrylate, isobornylacrylate, 2-ethylhexylmethacrylate, nonylmethacrylate, decylmethacrylate, laurylmethacrylate, palmitylmethacrylate, stearylmethacrylate, isobornylmethacrylate, or derivatives thereof; more in particular acrylates selected from 2-ethylhexylacrylate, or 2-ethylhexylmethacrylate.

In still another embodiment, the one or more monomers are olefins; more specifically olefins selected from ethylene, propylene, (iso)butene, hexene, octene, decene, dodecene and higher homologues. In one embodiment at least 30% (w/w %); in particular at least 40% (w/w %) of said olefins comprise a hydrophobic side chain, i.e. alkyl chains with 8 or more carbon atoms. In a specific embodiment the olefins comprising a hydrophobic side chain are selected from octene, decene, dodecene and higher homologues.

In a further embodiment, the one or more monomers are vinyl ethers; more specifically vinyl ethers selected from methyl vinyl ether, ethyl vinyl ether, propylvinyl ether, butyl vinyl ether, and higher alkyl homologues. In one embodiment at least 30% (w/w %); in particular at least 40% (w/w %) of said vinyl ethers comprise a hydrophobic side chain, i.e. alkyl chains with 8 or more carbon atoms.

In another embodiment, the one or more monomers are vinyl esters; more specifically vinyl esters selected from vinylacetate, vinyllactate, vinylpropionate, vinylstearate, vinylester of versatic acid, so-called veova monomers, or derivatives thereof.

In another embodiment, the one or more monomers are styrenes; more specifically styrenes selected from styrene, methylstyrene, alkylstyrenes or derivatives thereof. In one embodiment at least 30% (w/w %); in particular at least 40% (w/w %) of said styrenes comprise a hydrophobic side chain, i.e. alkyl chains with 8 or more carbon atoms.

In another embodiment, the one or more monomers are maleates; more specifically maleates selected from dimethylmaleate, diethylmaleate, di(iso)propylmaleate, di(iso)butylmaleate, dioctyl maleate, and higher alkyl homologues. In one embodiment at least 30% (w/w %); in particular at least 40% (w/w %) of said maleates comprise a hydrophobic side chain, i.e. alkyl chains with 8 or more carbon atoms.

In another embodiment, the one or more monomers are fumarates; more specifically fumarates selected from dimethylfumarates, diethylfumarate, di(iso)propylfumarate, di(iso)butylfumarate, dioctylfumarate and higher alkyl homologues. In one embodiment at least 30% (w/w %); in particular at least 40% (w/w %) of said fumarates comprise a hydrophobic side chain, i.e. alkyl chains with 8 or more carbon atoms.

In still another embodiment, the one or more monomers are itaconates; more specifically itaconates selected from dimethylitaconate, diethylitaconate, di(iso)propylitaconate, di(iso)butylitaconate, dioctylitaconate and higher alkyl homologues. In one embodiment at least 30% (w/w %); in particular at least 40% (w/w %) of said itaconates comprise a hydrophobic side chain, i.e. alkyl chains with 8 or more carbon atoms.

In a further aspect, the coating formulation according to all different embodiments further comprises one or more anti-blocking agents. Said anti-blocking agents can be selected from inorganic pigments, such as CaCO3, clay, talcum, titanium dioxide, silicon oxide or bentonite, or from organic polymeric pigments, such as polystyrene c-maleimide (SMI) or plastic pigments. In a specific embodiment, said anti-blocking agents are polymers with a Tg of at least 35° C. Such polymers can be selected from poly(meth)acrylates, polyvinylacetates, polyesters, polyethylene acrylates or polymers containing monomers based on (meth)acrylates, styrenes, vinylesters, vinylethers, maleates, fumarates, itaconates, maleimides and maleamides. In still another embodiment, the anti-blocking agents are polymers with a Tm of at least 35° C. In said instance, said polymers are selected from polyethylene, polypropylene, ethylene-propylene co-polymers, polyethylene vinylacetate, polyethylene vinylchloride, polyethylene acrylic acid, polyesters. In yet another aspect, the anti-blocking agents present in the coating formulation as contemplated herein can be a combination of any one of inorganic pigments, organic pigments, and polymers with a Tg of at least 35° C. and/or polymers with a Tm of at least 35° C. In a specific embodiment the combination is one of inorganic pigments and polymers with a Tg of at least 35° C. and/or polymers with a Tm of at least 35° C.

In a further aspect, the one or more anti-blocking agents are present in the coating formulation of the present disclosure in an amount between 10% and 70%; in particular in an amount between 25% and 60% (w/w %) of the solid weight composition of the coating formulation.

The coating formulation according to the present disclosure can further comprise other agents, such as tackifying agents, binders, wetting agents, anti-foam agents, surface tension reducing agents, biocides, dyes and/or pigments.

The coating formulation according to the different aspects of the present disclosure is specifically intended to make a substrate heat sealable and water and oil repellent. Therefore, another aspect of the present disclosure discloses a heat sealable, water repellent and oil repellent substrate comprising a substrate coated with a coating formulation according to any of the different embodiments as disclosed herein. In particular, said substrate is paper, plastic or cardboard. In a more preferred aspect, said substrate is paper or cardboard. In still another aspect, said substrate comprises the coating formulation on only one of its sides. In another aspect, said substrate comprises the coating formulation on both sides.

The present disclosure also provides the use of a coating formulation according its different embodiments for coating a substrate; preferably for coating of paper, plastic or cardboard. In a final aspect of the present disclosure, a process for making a heat sealable, water repellent and oil repellent substrate is provided. Said substrate can be selected from paper, plastic or carboard; preferably said substrate is paper or cardboard. The process of the present disclosure comprises the application of the coating formulation according to any of the embodiments as described herein on the substrate. The process may further comprise the application of an additional coating formulation, in addition to the coating formulation as contemplated herein.

The Present Disclosure is Also Described According to the Following Numbered Embodiments 1. A coating formulation comprising a polymer, wherein said polymer is produced by radical polymerization and said polymer comprises a backbone with one or more monomers, said one or more monomers comprising one or more hydrophobic side chains, said polymer exemplified in that:
the hydrophobic side chains are alkyl chains with 8 or more carbon atoms; and the overall weight of the hydrophobic side chains is at least 20% (w/w %) of the total weight of the polymer.
2. The coating formulation according to embodiment 1, wherein the coating formulation comprises at least 30% (w/w %) of the polymer produced by radical polymerization.
3. The coating formulation according to embodiment 2, wherein the coating formulation comprises between 30% (w/w %) and 80% (w/w %) of the polymer produced by radical polymerization.
4. The coating formulation according to any of the preceding embodiments, wherein the hydrophobic side chains are alkyl chains with 8 to 18 carbon atoms.
5. The coating formulation according to any of the preceding embodiments, wherein the hydrophobic side chains are linear or branched alkyl chains or a combination of linear and branched alkyl chains.
6. The coating formulation according to any of the preceding embodiments wherein the one or more monomers selected from acrylates, methacrylates, olefins, vinyl ethers, vinyl esters, styrenes, maleates, fumarates, itaconates, or derivatives thereof
7. The coating formulation according to embodiment 6 wherein the acrylates are selected from methylacrylate, ethyl acrylate, (iso)propylacrylate, (iso)butylacrylate, tertiary butylacrylate, 2-ethylhexylacrylate, nonylacrylate, decylacrylate, laurylacrylate, palmitylacrylate, stearylacrylate, isobornylacrylate, or derivatives thereof.
8. The coating formulation according to embodiment 6 wherein the methacrylates are selected from methylmethacrylate, ethyl methacrylate, (iso)propylmethacrylate, (iso)butylmethacrylate, tertiary butylmethacrylate, 2-ethylhexylmethacrylate, nonylmethacrylate, decylmethacrylate, laurylmethacrylate, palmitylmethacrylate, stearylmethacrylate, isobornylmethacrylate, or derivatives thereof
9. The coating formulation according to embodiment 6 wherein the olefins are selected from ethylene, propylene, (iso)butene, hexene, octene, decene, dodecene, and higher homologues.
10. The coating formulation according to embodiment 6 wherein the vinyl ethers are selected from methyl vinyl ether, ethyl vinyl ether, (iso)propylvinyl ether, (iso)butyl vinyl ether, and higher alkyl homologues.
11. The coating formulation according to embodiment 6 wherein the vinyl esters are selected from vinylacetate, vinylpropionate, vinylstearate, vinylester of versatic acid, or derivatives thereof
12. The coating formulation according to embodiment 6, wherein the styrenes are selected from styrene, methylstyrene, alkylstyrene or derivatives thereof 13. The coating formulation according to embodiment 6 wherein the maleates are selected from dimethylmaleate, diethylmaleate, di(iso)propylmaleate, di(iso)butylmaleate, dioctylmaleate, and higher alkyl homologues.
14. The coating formulation according to embodiment 6 wherein the fumarates are selected from dimethylfumarate, diethylfumarate, di(iso)propylfumarate, do(iso)butylfumarate, dioctylfumarate, and higher alkyl homologues.
15. The coating formulation according to embodiment 6 wherein the itaconates are selected from dimethylitaconate, diethylitaconate, di(iso)propylitaconate, di(iso)butylitaconate,
dioctylitaconate and higher alkyl homologues.
16. The coating formulation according to any of the preceding embodiments, further comprising one or more anti-blocking agents.
17. The coating formulation according to embodiment 16, wherein the one or more anti-blocking agents are selected from inorganic pigments or organic pigments; in particular inorganic pigments.
18. The coating formulation according to embodiment 17 wherein the inorganic pigments are selected from CaCO3, clay, talcum, bentonite, titanium dioxide, and silicon oxide.
19. The coating formulation according to embodiment 17 wherein the organic pigments are selected from polystyrene-c-maleimide (SMI) or plastic pigments.
20. The coating formulation according to embodiment 16, wherein the one or more anti-blocking agents are polymers with a Tg of at least 35° C.
21. The coating formulation according to embodiment 20 wherein the one or more polymer anti-blocking agents are selected from polyacrylates, poly(meth)acrylates, polyvinyl acetates, polyesters, polyethylene acrylates, and polymers containing monomers based on acrylates, (meth)acrylates, styrenes, vinylesters, vinylethers, maleates, fumarates, itaconates, maleimides, and maleamides.
21. The coating formulation according to embodiment 16, wherein the one or more anti-blocking agents are polymers with a Tm of at least 35° C.
22. The coating formulation according to embodiment 22, wherein the one or more polymer anti-blocking agents are selected from polyethylene, polypropylene, ethylene-propylene co-polymers, polyethylene vinylacetate, polyethylene acrylic acid, polyethylene vinylchloride, and polyesters.
23. The coating formulation according to embodiment 16, wherein the one or more anti-blocking agents are a combination of an inorganic pigments and a polymer anti-blocking agent with a Tg
or Tm of at least 35° C.
24. The coating formulation according to embodiment 24, wherein the inorganic pigments are selected from CaCO3, clay, talcum, bentonite, titanium dioxide, and silicon oxide; and wherein the polymer anti-blocking agent with a Tg or Tm of at least 35° C. are selected from polyethylene, polypropylene, ethylene-propylene co-polymers, polyethylene vinylacetate, polyethylene vinylchloride, polyesters, poly(meth)acrylates, polyvinyl acetates, polyesters, polyethylene acrylates, polyethylene acrylic acids, and polymers containing monomers based on (meth)acrylates, styrenes, vinylesters, vinylethers, maleates, fumarates, itaconates, maleimides, and maleamides; in particular the polymer anti-blocking agent with a Tg or Tm of at least 35° C. are selected from polymers containing monomers based on (meth)acrylates, styrenes, vinylesters, vinylethers, maleates, fumarates, itaconates, maleimides, and maleamides.
25. The coating formulation according to any one of embodiments 16 to 25, wherein the one or more anti-blocking agents are present in the coating formulation in an amount between 10% and 70%; in particular in an amount between 25% and 60% (w/w %) of the solid weight composition of the coating formulation.
26. A heat sealable, water repellent and oil repellent substrate comprising a substrate coated with a coating formulation according to any one of the preceding embodiments.
27. The heat sealable, water repellent and oil repellent substrate according to embodiment 27, wherein the substrate is selected from paper, plastic or cardboard, wood, thermoplastic or thermoset materials, glass, textile, leather and metals; preferably paper or cardboard.
28. The heat sealable, water repellent and oil repellent substrate according to embodiment 27 or 28, wherein the coating formulation is present on one side of the substrate.
29. The heat sealable, water repellent and oil repellent substrate according to any one of the embodiments 27 to 29, wherein the coating formulation is present on both sides of the substrate.
31. Use of a coating formulation according to any one of the embodiments 1 to 30 for coating of a substrate; preferably for coating of paper, cardboard or plastic.
32. A process for making a heat sealable, water repellent and oil repellent substrate wherein a coating formulation according to any one of the claims 1 to 26 is applied on a substrate.
33. The process according to embodiment 32, wherein the substrate is selected from paper, plastic, or cardboard; preferably paper or cardboard.
34. The process according to embodiment 32 or 33, wherein the coating formulation is applied on one side of the substrate.
35. The process according to any one of the embodiments 32 to 34, wherein the coating formulation is applied on both sides of the substrate.
36. A coating formulation comprising a polymer produced by radical polymerization and said polymer comprises a backbone with one or more monomers, wherein one or more of said monomers comprises one or more hydrophobic side chains, said polymer exemplified in that:
the hydrophobic side chains are alkyl chains with 8 or more carbon atoms;
the overall weight of the hydrophobic side chains is at least 20% (w/w %) of the total
weight of the polymer; and
wherein said coating formulation comprises at least 30% (w/w %) of such polymer and said coating formulation further comprises one or more anti-blocking agents selected from inorganic pigments or polymers with a Tg or Tm of at least 35° C.
37. The coating formulation according to embodiment 36 wherein at least 30% (w/w %); in particular from about 40% (w/w %) to about 70% (w/w %); of the one or more monomers in the backbone of the polymer comprise the one or more hydrophobic side chains.
38. The coating formulation according to embodiments 36 or 37, wherein the coating formulation comprises between 30% (w/w %) and 80% (w/w %) of polymers produced by radical polymerization.

39. The coating formulation according to any of the preceding embodiments wherein the polymer is a co-polymer produced by radical polymerization of one or more monomers, wherein at least 40% (w/w %) of said monomers comprises one or more alkyl chains with 8 or more carbon atoms.

The monomers that form the hydrophobic side chains, in particular including one or more alkyl chains with 8 or more carbon atoms, are hereinafter also referred to as the hydrophobic monomers. In the radical polymerization reaction these hydrophobic monomers are combined with monomers lacking such hydrophobic side chains, i.e. in comprising side chains with less than 8 carbon atoms, hereinafter also referred to as the non-hydrophobic monomers. Within the radical polymerization reaction the hydrophobic monomers and the non-hydrophobic monomers can belong to the same class such as acrylates, methacrylates, olefins, vinyl ethers, vinyl esters, styrenes, maleates, fumarates, itaconates, or derivatives thereof, and would only differ from one another in the hydrophobicity of the side chains, wherein the hydrophobic monomers comprise one or more alkyl chains with 8 or more carbon atoms, and the non-hydrophobic monomers comprise one or more alkyl chains with less than 8 carbon atoms.

Hence, expressed differently, the polymers used in the coating formulations according to the present disclosure are produced by radical polymerization of one or more hydrophobic monomers with one or more non-hydrophobic monomers, wherein at least 40% (w/w %) of said monomers are hydrophobic monomers. In a particular embodiment from about 40% (w/w %) to about 70% (w/w %) of said monomers are hydrophobic monomers. In another embodiment from about 40% (w/w %) to about 70% (w/w %) of said monomers are hydrophobic monomers, and at least 25% (w/w %) of said monomers are non-hydrophobic monomers. In another embodiment from about 40% (w/w %) to about 70% (w/w %) of said monomers are hydrophobic monomers, and from about 30% (w/w %) to about 50% (w/w %) of said monomers are non-hydrophobic monomers.

In an embodiment as contemplated herein, the one or more monomers comprising one or more hydrophobic side chains, also referred to as the hydrophobic monomers are acrylates or methacrylates selected from 2-ethylhexylacrylate, nonylacrylate, decylacrylate, laurylacrylate, palmitylacrylate, stearylacrylate, isobornylacrylate, 2-ethylhexylmethacrylate, nonylmethacrylate, decylmethacrylate, laurylmethacrylate, palmitylmethacrylate, stearylmethacrylate, isobornylmethacrylate, or derivatives thereof; more in particular acrylates or methacrylates selected from 2-ethylhexylacrylate, or 2-ethylhexylmethacrylate.

In an embodiment as contemplated herein, the coating formulation according to any of the preceding claims wherein the non-hydrophobic monomers are styrenes, acrylates or methacrylates selected from styrene, methylstyrene, methylacrylate, ethyl acrylate, (iso)propylacrylate, (iso)butylacrylate, tertiary butylacrylate, methyl methacrylate, ethyl methacrylate, (iso)propylmethacrylate, (iso)butylmethacrylate, tertiary butylmethacrylate, or derivatives thereof; more in particular acrylates selected from (iso) butylacrylate, methylacrylate, ethyl acrylate, methyl methacrylate, or ethyl methacrylate.

The coating formulation according to any of the preceding embodiments wherein the polymer anti-blocking agents are selected from polyacrylates, poly(meth)acrylates, polyvinyl acetates, polyvethylene vinylacetates, polyethylene, polypropylene, copolymers of ethylene and propylene, polyesters, or polymers containing monomers based on acrylates, (meth)acrylates, acrylic acids, styrenes, ethylene, propylene, vinylesters, vinylethers, maleates, fumarates, itaconates, maleimides and maleamides; in particular polymers containing monomers based on (meth)acrylates, styrenes, ethylene, propylene, vinylesters, vinylethers, maleates, fumarates, itaconates, maleimides and maleamides.

The present disclosure thus provides a novel coating formulation that is particularly useful for the coating of a substrate to make that substrate water repellent, oil repellent and heat sealable. The coating formulation of the present disclosure is exemplified in that it comprises a polymer produced by radical polymerization, wherein said polymer comprises a backbone with one or more monomers that comprise one or more hydrophobic side chains with 8 or more carbon atoms. The polymer is further exemplified in that the overall weight of the hydrophobic side chains is at least 20% (w/w %) of the total weight of the polymer. It has been observed that despite their low Tg the use of a polymer with such amount of hydrophobic side chains in a coating formulation provides said formulation with a good sealability, high water repellency and a relatively low blocking behavior. Typical for the present disclosure is thus that it provides a heat sealable, water repellent and oil repellent coating without the presence of a wax. As a result, the present coating formulation is particularly useful in the food industry for making heat sealable, water repellent and oil repellent substrates that can be used for the manufacture of food cups or food boxes.

The polymer present in the coating formulation is typically produced by radical polymerization. Radical polymerization has the advantage that it can be performed in an aqueous system. Usually during radical polymerization, an emulsion of the monomers is made and radicals are produced by an initiator. Said radical emulsion polymerization reaction can be performed without excessive purity conditions and at or above ambient temperature. The radical emulsion polymerization usually leads to polymers with a high molecular weight, which is beneficial to maintain a good seal when the polymer is used to seal two substrates. Another advantage of the radical polymerization is that a whole range of monomers can be selected to adapt the final properties of the polymer. In that respect the amount of long alkyl groups can be well-defined and the Tg can—to a certain extent—be selected. A higher amount of long alkyl groups will provide a higher hydrophobicity to the polymer and it will result in a lower Tg. A low Tg is beneficial to have a better film formation and a more closed film leads to better barrier properties.

On the other hand, a low Tg polymer will suffer from blocking problems. A paper coated on an on-line or off-line coating machine will be wound on a roll. Under the high pressure of the roll the coated paper may adhere to each other. This is especially the case when the rolls are double side coated. It has been found that the polymers as contemplated herein, and comprising at least 20% (w/w %) of the total weight of the polymer alkyl side chains with 8 or more carbon atoms, show relatively low blocking behavior compared to their Tg. The long alkyl groups on the polymer have a softening effect of the polymer but nevertheless they show less blocking behavior than polymers without the long alkyl groups and with similar Tg profiles.

In addition, the coating formulation further comprises anti-blocking agents. Said anti-blocking agents can be organic pigments, such as polystyrene c-maleimide or plastic pigments, such as hollow polystyrene particles, or inorganic pigments, such as CaCO3, clay, talcum, titanium dioxide, silicon oxide or betonite. In another embodiment, said anti-blocking agents are polymers with a Tg of at least 35° C., or a Tm of at least 35° C. In a preferred embodiment, the anti-blocking agents are inorganic pigments, polymers with a Tg or Tm between 40° C. and 200° C., or combinations thereof.

A good heat sealability of a coating formulation requires that it has good flowing properties to form a film when exposed to the heat press. The inorganic pigments are inert to the heat and pressure exerted during the heat seal operation and accordingly create a flow-path for a proper distribution of the melted polymer as contemplated herein, and comprising at least 20% (w/w %) of the total weight of the polymer alkyl side chains with 8 or more carbon atoms. The amount of anti-blocking agent in the coating formulation is preferably in an amount between 10% and 70%; in; in particular in an amount between 25% and 60% (w/w %) of the solid weight composition of the coating formulation. The amount of inorganic pigments is preferably lower than 40%, more preferably lower than 35% of the total coating weight. Higher amounts of inorganic pigments will mask the film and reduce the sealability of the coating formulation.

Hence in a particular embodiment said anti-blocking agents are the combination of an inorganic pigments, such as CaCO3, clay, talcum, titanium dioxide, silicon oxide or bentonite; and polymers with a Tg of at least 35° C., or a Tm of at least 35° C., such as polyacrylates, poly(meth)acrylates, polyvinyl acetates, polyethylene vinylacetates, polyesters, or polymers containing monomers based on acrylates, (meth)acrylates, styrenes, acrylic acids, vinylesters, vinylethers, maleates, fumarates, itaconates, maleimides and maleamides; in particular polymers containing monomers based on acrylates and (meth)acrylates. In such combination the inorganic pigments will still function to create a flow-path for a proper distribution of the melted polymer, but without masking the film as the polymer anti-blocking agents with a Tg of at least 35° C., or a Tm of at least 35° C. will blend with the melted polymer as contemplated herein, during the heat seal operation and even enhance the tackiness of the coating formulation at such heat seal operational stage.

Best results are achieved with a combination of an inorganic pigment, particularly with a talcum pigment because of its hydrophobic nature, with polymers having a Tg of at least 35° C., or a Tm of at least 35° C., wherein the ratio of inorganic pigment to polymers with a Tg of at least 35° C., or a Tm of at least 35° C. is preferably equal to or smaller than 1. In a particular embodiment the ratio of inorganic pigment to polymers with a Tg of at least 35° C., or a Tm of at least 35° C. is from about 0.3 to about 0.8.

Expressed in weight percent of the solid weight composition of the coating formulation, the amount of inorganic pigment is from about 10% to about 30% and the amount of polymer with a Tg of at least 35° C., or a Tm of at least 35° C. is from about 10% to about 40%, and wherein the ratio of inorganic pigment to polymers with a Tg of at least 35° C., or a Tm of at least 35° C. is equal to or smaller than 1; in particular from about 0.3 to about 0.8.

In a further preferred embodiment cyclic imide containing polymers as described in patent application EP-A 2007/006518 are used as anti-blocking agents. Upon drying of the coating formulation these products provide good water repellency. These products have a core-shell structure, whereby the shell has a cyclic imide containing product and the core is a non-water soluble product. Such products are for instance vegetable oils, waxes, rosin gums, silicon oils, and derivatives, oligomers and polymers of ethylene, propylene, (iso)butene, butadiene and mixtures thereof. The higher the content of the aliphatic groups in the core-shell particles, the better will be the water repellency of the resultant coating.

While the polymer as contemplated herein has tackifying properties also other tackifiers may be present. Examples of tackifiers can be acrylic emulsions, rosin derivatives, low molecular weight polyethylenes or polyesters. Polymers that have a high amount of carboxylic acid groups can be used as tackifying agents. Such a polymer is for instance polyethylene acrylic acid of which the acrylic acid content is at least 10% of the total weight of the polymer. The additional tackifier is usually present in an amount lower than 35% of the total coating formulation.

The coating formulation as contemplated herein may contain further binders. These adhesive binder(s) are selected from polystyrene butadiene emulsions, dispersions of polyacrylate, polystyrene acrylate, polyurethane, polyvinyl acetate, polyethylene vinylacetate, polyethylene acrylate, ethylene vinylchloride co-polymers, polyethylene, polypropylene, polyesters, co-polymers of styrene and maleic anhydride salts, or mixtures thereof. Said other adhesive binder(s) are present in the coating between 5% and 45%, preferably between 5% and 40%, more preferably between 5 and 35%.

The heat sealable coating as described herein can be applied on different substrates. Typical substrates are paper, card board, wood, thermoplastic and thermoset materials, glass, textile, leather and metals, preferably paper and card board.

The coating layer can be applied on the substrate by typical coating techniques such as spraying, smearing, dipping, printing, rolling and painting. For paper and card board applications, coating layers are mostly applied by a blade coater, a rod coater, an air knife coater, a curtain coater, an Invo-coater, a size press or a film press. Once applied, the coating can be dried to the air or a more rapid drying can be achieved by bringing the coated substrate under infra-red lamps or in an oven. A person skilled in the art will make sure that the temperature or the residence time is no too high so that the dried coating will not stick to each other and that the coating will retain its heat sealability properties.

The amount of coating applied on the substrate will be dependent on the type of carrier layer, i.e. substrate to be coated and on the required adhesion to be achieved between the substrates.

For porous materials, a higher amount of coating will be needed. For paper and card board usually a layer of 2 to 25 gram (dry) coating per square meter could be employed, but preferably a layer between 5 and 20 gram (dry) per square meter is applied. A thinner layer is beneficial as it will reduce the weight of the packaging material and will reduce costs, while a thicker layer might be necessary to increase the adherence during the heat sealing.

In another aspect, the coating formulation is applied on the substrate as a layer of 3 to 20 gram (dry) per square meter, preferably as a layer of 6 to 12 gram (dry) per square meter.

It is also possible to apply multiple coating layers on the carrier layer, i.e. substrate. Especially when porous materials are treated it is interesting to apply first a coating layer that closes the pores of the substrate. Preferably, this coating layer forms a closed film. A typical film would be formed from a formulation containing a polystyrene butadiene latex or poly acrylic dispersion that may contain fillers and pigments up to 95%. Preferably the amount of filler is between 20 and 80%. This formulation may also contain some water repellency agents, such as for instance waxes, but the amounts should be limited in order to allow the application of a second layer as contemplated herein. Usually, when a pre-coating is applied the layer thickness is between 1 and 15 gram (dry) per square meter.

The coated substrate can be sealed to another coated substrate, but it is also possible to heat seal the coated substrate with a non-treated substrate. In case the non-treated substrate is not adhering well to the coated substrate, usually, the application of a tiny layer of coating according the present application, for instance 1 to 3 gram (dry) per square meter, is sufficient to make the substrate good sealable.

In case the paper substrate is used to make cups for cold drinks a thicker coating layer as contemplated herein is applied, usually between 3 and 10 gram (dry) per square meter. This layer will not only provide improved heat sealability but it will also function as a barrier against condensed water.

The coated substrate can be sealed by the classical processes such as the ones based on for instance hot air and ultra-sound. During the heating a pressure is applied on the substrates to improve the adherence.

In case paper or card board is used as a substrate it has been found that the coated material as contemplated herein is repulpable. This has a major impact on the costs and the environmental friendliness of the packaging material. First of all, during the formation of the shaped packaging material, there is some left over paper or card board that can be brought back to the pulp machines. Secondly, the used packaging material will find a second life as recycled paper or card board.

The present disclosure further relates to a coating layer that shows a good water repellency. A coating layer with good heat sealability and good water repellency can substitute thermoplastic layers such as polyethylene and polypropylene. These thermoplastic layers often disturb the recycling process of the substrates that are treated with these layers.

The coating formulation can be further applied on the substrate by a printing technique. Said printing can be done by classical printing machines such as off-set, roto-gravure, (rotary) screen printing, flexo printing or laser printing. Usually, the printing equipment has several printing devices next to each other. The devices contain different colours. In the present disclosure, one or more of these devices can be used to print the coating layer on the substrate.

The present disclosure is further disclosed using the following examples.

EXAMPLES

Polymer Emulsions

Latex Example 1; 34.5% MMA, 64.5% EHA, and 1% AAc

To make the pre-emulsion, 110.6 g deionized (DI) water, 2.42 g sodium bicarbonate, 70.7 g methyl methacrylate, 132.7 g 2-ethylhexyl acrylate, 2.02 g acrylic acid, and 36.0 g of 20 wt % aqueous solution of sodium salt of lauryl sulfonic acid (SLS) were added to a 1 L beaker with a magnetic stirrer and degassed by nitrogen purge for 20 minutes. ULTRA TURRAX SD-45 high speed disperser was then used to homogenize the pre-emulsion at 5000 rpm.

A 500 mL 5-necked jacketed reaction kettle equipped with overhead mechanical stirrer with half-moon impeller, reflux condenser, addition funnel, and thermocouple was charged with 110.6 g DI water, 2.0 g aqueous solution of sodium persulfate (SPS, 10 wt %), 4.0 g aqueous solution of SLS (20 wt %), and 20% of the pre-emulsion (70.9 g). The kettle was heated to 75° C. under nitrogen blanket and mild stirring (ca. 250 rpm) for 45 minutes to generate the seed particles. Then the remainder of the pre-emulsion (283.5 g) was fed through the addition funnel over three hours, and 2 g SPS (10 wt %) was simultaneously fed via a separate line for 3 hour and 15 minutes. After completion of the initiator solution, the temperature was maintained at 75° C. for another 60 minutes. The reaction mixture was then opened to air, cooled down to room temperature, and filtered. The final product is a 45 wt % water-based latex comprising 34.5 wt % methyl methacrylate, 64.5 wt % of monomer with hydrophobic side chains containing at least 8 carbon atoms (i.e., 2-ethylhexyl acrylate), and 1% acrylic acid. The overall weight of the hydrophobic side chains is 40% (w/w %) of the total weight of the polymer. The measured Tg by DSC is −23° C.

Latex Example 2; 39.5% MMA, 10% BuA, 49.5% EHA, and 1% AAc

The same apparatus and procedure was used to make Latex 2, but the composition and solid content of the latex product is different. The pre-emulsion of example 2 consists of 51.6 g DI water, 2.42 g sodium bicarbonate, 80.8 g methyl methacrylate, 20.2 g n-butyl acrylate, 102.0 g 2-ethylhexyl acrylate, 2.02 g acrylic acid, and 36.0 g of SLS solution (20 wt %). The kettle was initially charged by 51.6 g DI water, 2.0 g aqueous solution of SPS (10 wt %), 4.0 g aqueous solution of SLS (20 wt %), and 59 g of the pre-emulsion. The second pre-emulsion charge was a feed of 236.1 g during three hours. 2.0 g aqueous solution of SPS (10 wt %) was also co-feed for three hours and 15 minutes. The final solid content of the latex product is 60 wt %, and the copolymer composition is 39.5% methyl methacrylate, 10% n-butyl acrylate, 49.5% of monomer with hydrophobic side chains containing at least 8 carbon atoms (i.e., 2-ethylhexyl acrylate), and 1% acrylic acid. The overall weight of the hydrophobic side chains is 30% (w/w %) of the total weight of the polymer. The measured Tg by DSC is −10° C.

Latex Example 3; 78% MMA, 21% EHA, and 1% AAc

To make the pre-emulsion, 110.6 g deionized (DI) water, 2.42 g sodium bicarbonate, 155.8 g methyl methacrylate, 42.2 g 2-ethylhexyl acrylate, 2.02 g acrylic acid, and 36.0 g of 20 wt % aqueous solution of sodium salt of lauryl sulfonic acid (SLS) were added to a 1 L beaker with a magnetic stirrer and degassed by nitrogen purge for 20 minutes. ULTRA TURRAX SD-45 high speed disperser was then used to homogenize the pre-emulsion at 5000 rpm.

A 500 mL 5-necked jacketed reaction kettle equipped with overhead mechanical stirrer with half-moon impeller, reflux condenser, addition funnel, and thermocouple was charged with 110.6 g DI water, 2.0 g aqueous solution of sodium persulfate (SPS, 10 wt %), 4.0 g aqueous solution of 10 SLS (20 wt %), and 20% of the pre-emulsion (70.9 g). The kettle was heated to 75° C. under nitrogen blanket and mild stirring (ca. 250 rpm) for 45 minutes to generate the seed particles. Then the remainder of the pre-emulsion (283.5 g) was fed through the addition funnel over three hours, and 2 g SPS (10 wt %) was simultaneously fed via a separate line for 3 hour and 15 minutes. After completion of the initiator solution, the temperature was maintained at 75° C. for 15 another 60 minutes. The reaction mixture was then opened to air, cooled down to room temperature, and filtered. The final product is a 45 wt % water-based latex comprising 78 wt % methyl methacrylate, 22 wt % of 2-ethylhexyl acrylate and 1% acrylic acid. The Tg of the polymer is measured by DSC to be +55° C.

Wax Encapsulated Styrene Maleimide Co-Polymer

To a 1 litre double walled, oil heated autoclave, having an anchor stirrer, 156 g of a polystyrene maleic anhydride (SMA) (grade: 26080; from Polyscope, the Netherlands) and 467 g of water were added. The SMA had a maleic anhydride content of 26 mole % and a molecular weight of 80.000 g/mole. To this reaction mixture was added 124.28 g of paraffin wax with a melting point of 57 C, 110 g of paraffin wax with a melting point of 75° C. (e.g. Cerasur 725) and 38.4 g of a 18% ammonia solution so that the maleic anhydride (MA):NH3 ratio was about 1:1. The temperature was raised to 160° C. and this temperature was maintained during 4 hours. Thereafter, the reaction mixture was slowly cooled down to room temperature. A polymer dispersion was obtained having a solid content of approximately 46 wt. %, the particle size being between 100 and 140 nm. The pH value was 7.2, indicating a high conversion of the maleic anhydride groups into maleimides.

FORMULATIONS

Example 1

To 763 grams of polymer dispersion from Latex Example 2 was added 89 grams of Acronal S940 (from BASF) and 145 grams of the wax encapsulated co-polymer of styrene maleimide. The end-product is a stable dispersion with a solid content of 45% and pH between 8.5-9.

Example 2

To 754 grams of polymer dispersion from Latex Example 2 was added 187 grams of Acronal S940 (from BASF) and subsequently 48 grams of talcum (Lithocoat, ex Imerys) was dispersed. The end-product is a stable dispersion with a solid content of 48% and pH between 8.5-9.

Example 3

To 461 grams of polymer dispersion from Latex Example 2 was added 399 grams of Acronal S980 (from BASF) and subsequently 128 grams of talcum (Lithocoat ex Imerys) was dispersed. The end-product is a stable dispersion with a solid content of 51% and pH between 8.5-9.

Example 4

To 748 grams of polymer dispersion from Latex Example 2 was added 93 grams of Acronal S940 (from BASF). In this mixture, 48 grams of Lithocoat (from Imerys) was dispersed and 101 grams of the wax encapsulated co-polymer of styrene maleimide. The end-product is a stable dispersion with solid content of 47% and pH between 8.5-9.

The coating formulations 1-8 were applied on Isla Cup Base board (from KotkaMills), having a weight of 263 gram per square meter (gsm). 30 gsm of liquid coating was applied on only one side of the cup stock paper. All the coated papers had good water resistance as the Cobb 1800 (1800 minutes) (TAPPI T441) values of the coated cup stock ranged between 4 and 10 grams per square meter.

The different coated cup stock papers were sealed with the W-300D(A) apparatus from Wu-Hsing Electronics Ltd. All coated papers were sealed within 1.5 seconds at 150° C. and 6 bar for coating on coating and 2 seconds when coated papers were sealed with blank papers. The quality of the seal was measured as a function of fibre tear when sealed papers were removed from each other. In all described examples excellent fibre tear was obtained.

The coated cup stock paper was subjected to a KIT 3M test (TAPPI T559). KIT-values higher than 12 were obtained for all coated papers.

The coated cup stock paper was subjected to block resistance tests.

TABLE 1

Solid weight composition of formulated examples

| | Example 1 | Example 2 | Example 3 | Example 4 |
|---|---|---|---|---|
| Latex example 2 | 75 | 70 | 40 | 70 |
| Acronal S940 (Tg = 79° C.) | 10 | 20 | | 10 |
| Acronal S980 (Tg = 50° C.) | | | 35 | |
| Co-polymer of styrene maleimide | 15 | | | 10 |
| Lithocoat | | 10 | 25 | 10 |

TABLE 2

Sealability and block resistance of the coated papers

| | Example 1 | Example 2 | Example 3 | Example 4 |
|---|---|---|---|---|
| Seal coating on blank | Ok | Ok | Not ok | Ok |
| Seal coating on coating | Ok | Ok | Ok | Ok |
| Block resistance coating on blank | Ok | Ok | Ok | Ok |
| Block resistance coating on coating | Not ok | Not ok | Ok | Not ok |

Blank: Non-Coated 236 Gsm Isla Cup Base Board (from KotkaMills)

TABLE 3

Solid weight composition of styrene free formulated examples

| | Example 5 | Example 6 | Example 7 | Example 8 |
|---|---|---|---|---|
| Latex example 1 | 55 | | 40 | |
| Latex example 2 | | 60 | | 40 |
| Latex example 3 | 30 | 30 | 35 | 40 |
| Lithocoat | 15 | 10 | 25 | 20 |

TABLE 4

Sealability and block resistance of the coated papers

| | Example 5 | Example 6 | Example 7 | Example 8 |
|---|---|---|---|---|
| Seal coating on blank | Ok | Ok | Not ok | Not ok |
| Seal coating on coating | Ok | Ok | Ok | Ok |
| Block resistance coating on blank | Ok | Ok | Ok | Ok |
| Block resistance coating on coating | Not ok | Not ok | Ok | Ok |

The examples of the formulated products show that it is possible to obtain good combinations of good sealability with sufficient block resistance. These properties were obtained for single side coated papers (examples 1, 2, 4, 5 and 6) as for double side coated paper (example 3, 7 and 8).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It being understood that various changes may be made in the function and arrangement of elements described in an exemplary embodiment without departing from the scope of the present disclosure as set forth in the appended claims.

The invention claimed is:

1. A coating formulation comprising: a polymer produced by radical polymerization, wherein said polymer comprises a structural unit derived from one or more monomers, wherein one or more of said monomers comprises one or more hydrophobic side chains, wherein the hydrophobic side chains are at least one of linear or branched alkyl chains with 8 or more carbon atoms, wherein the overall weight of the hydrophobic side chains is at least 40% (w/w %) of the total weight of the polymer; and wherein said coating formulation comprises at least 30% (w/w %) of said polymer, and said coating formulation further comprises anti-blocking agents, wherein the anti-blocking agents are a combination of inorganic pigments with polymers with a Tg or Tm of more than 35° C., wherein the ratio of inorganic pigment to polymers with a Tg or Tm of more than 35° C. is equal to or smaller than 1, and wherein the coating formulation provides a heat sealability performance within 1.5 seconds at 150° C. and is repulpable when applied to a paper or Cardboard, and wherein coating formulation does not comprise cellulose.

2. The coating formulation of claim 1, wherein at least 30% (w/w %) of the structure unit derived from the one or more monomers comprise hydrophobic side chains, and the hydrophobic side chains are alky chains with 8 to 11 carbon atoms.

3. The coating formulation according to claim 1, wherein the coating formulation comprises between 30% (w/w %) and 80% (w/w %) of polymers produced by radical polymerization, and wherein the water is present in 45 weight percent.

4. The coating formulation according to claim 1, wherein the polymer comprises a copolymer comprising hydrophobic and non-hydrophobic monomers, the non-hydrophobic monomers comprising alkyl side chains with less than 8 carbon atoms.

5. The coating formulation according to claim 1, wherein hydrophobic monomers constitute at least 40% (w/w %) and up to 70% (w/w %) of the total monomer weight used in the polymer.

6. The coating formulation according to claim 1, wherein the one or more monomers are selected from acrylates, methacrylates, olefins, vinyl ethers, vinyl esters, styrenes, maleates, fumarates, itaconates, or derivatives thereof.

7. The coating formulation according to claim 1, wherein the polymer anti-blocking agents are selected from poly (meth)acrylates, polyvinyl acetates, polyethylene vinylacetates, polyesters, or polymers containing monomers based on (meth)acrylates, styrenes, vinylesters, vinylethers, maleates, fumarates, itaconates, maleimides and maleamides.

8. The coating formulation according to claim 1, wherein the polymer anti-blocking agents are selected from polyethylene, polypropylene, ethylene-propylene co-polymers, polyethylene vinylacetate, polyethylene vinylchloride, polyethylene acrylates, and polyesters.

9. A heat sealable, water repellent and oil repellent substrate comprising a substrate coated with a coating formulation according to claim 1.

10. A process for making a heat sealable, water repellent and oil repellent substrate wherein a coating formulation according to claim 1 is applied on a substrate.

11. The coating formulation of claim 1, wherein from about 40% (w/w %) to about 70% (w/w %) of the structure unit derived from the one or more monomers comprises one or more hydrophobic side chains.

12. The coating formulation according to claim 1, wherein the one or more monomers comprising one or more hydrophobic side chains are acrylates selected from nonylmethacrylate, decylmethacrylate, laurylmethacrylate, palmitylmethacrylate, stearylmethacrylate, isobornylmethacrylate, or derivatives thereof.

13. The heat sealable, water repellent and oil repellent substrate according to claim 9, wherein the substrate is selected from paper, plastic or card board.

14. The heat sealable, water repellent and oil repellent substrate according to claim 9, wherein the substrate is selected from paper or cardboard.

15. The process according to claim 10, wherein the coating formulation is applied on a substrate selected from paper, plastic or cardboard, wood, thermoplastic or thermoset materials, glass, textile, leather and metals.

16. The coating formulation according to claim 1, wherein the one or more monomers comprising one or more hydrophobic side chains are acrylates comprising at least one of methylacrylates, or ethyl acrylates.

17. The coating formulation according to claim 1, wherein the ratio of inorganic pigment to polymers with a Tg of at least 35° C., or a Tm of at least 35° C. is from about 0.3 to about 0.8.

18. The coating formulation according to claim 1, wherein the coating formulation is free of wax.

\* \* \* \* \*